Aug. 28, 1962  J. C. GEVAS  3,051,006
VERTICAL REFERENCE SYSTEM
Filed April 6, 1960  2 Sheets-Sheet 1
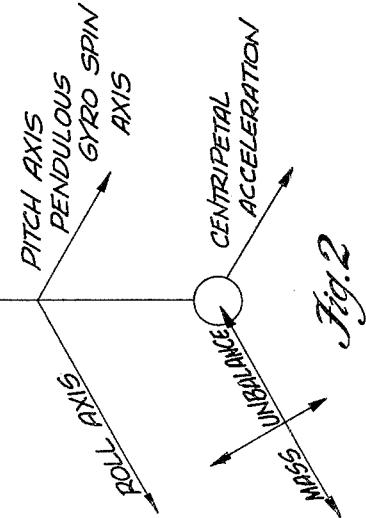
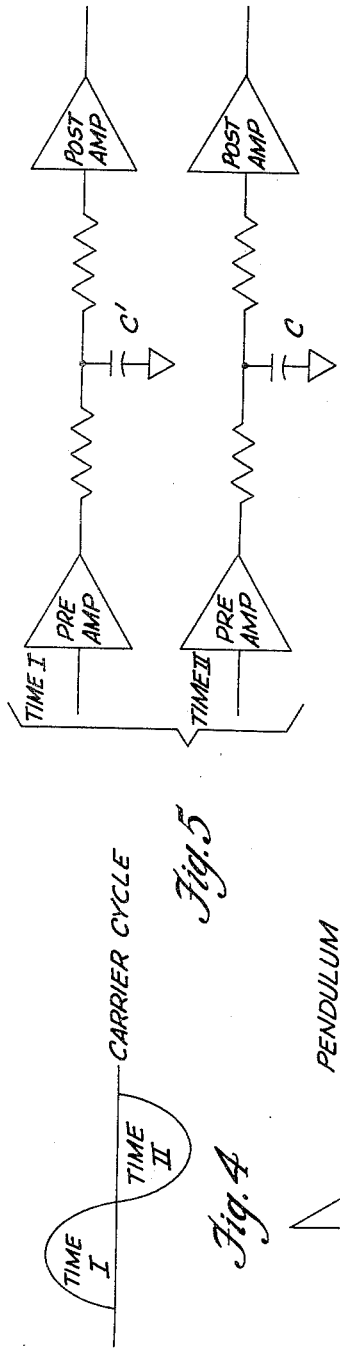
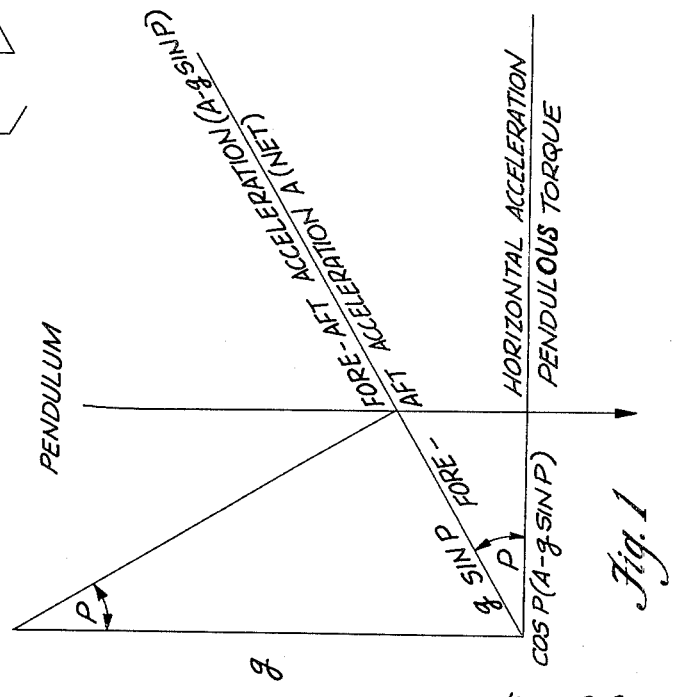
JAMES C. GEVAS
INVENTOR.
BY Andrew L. Bain
George B. Oujevolff
ATTORNEYS

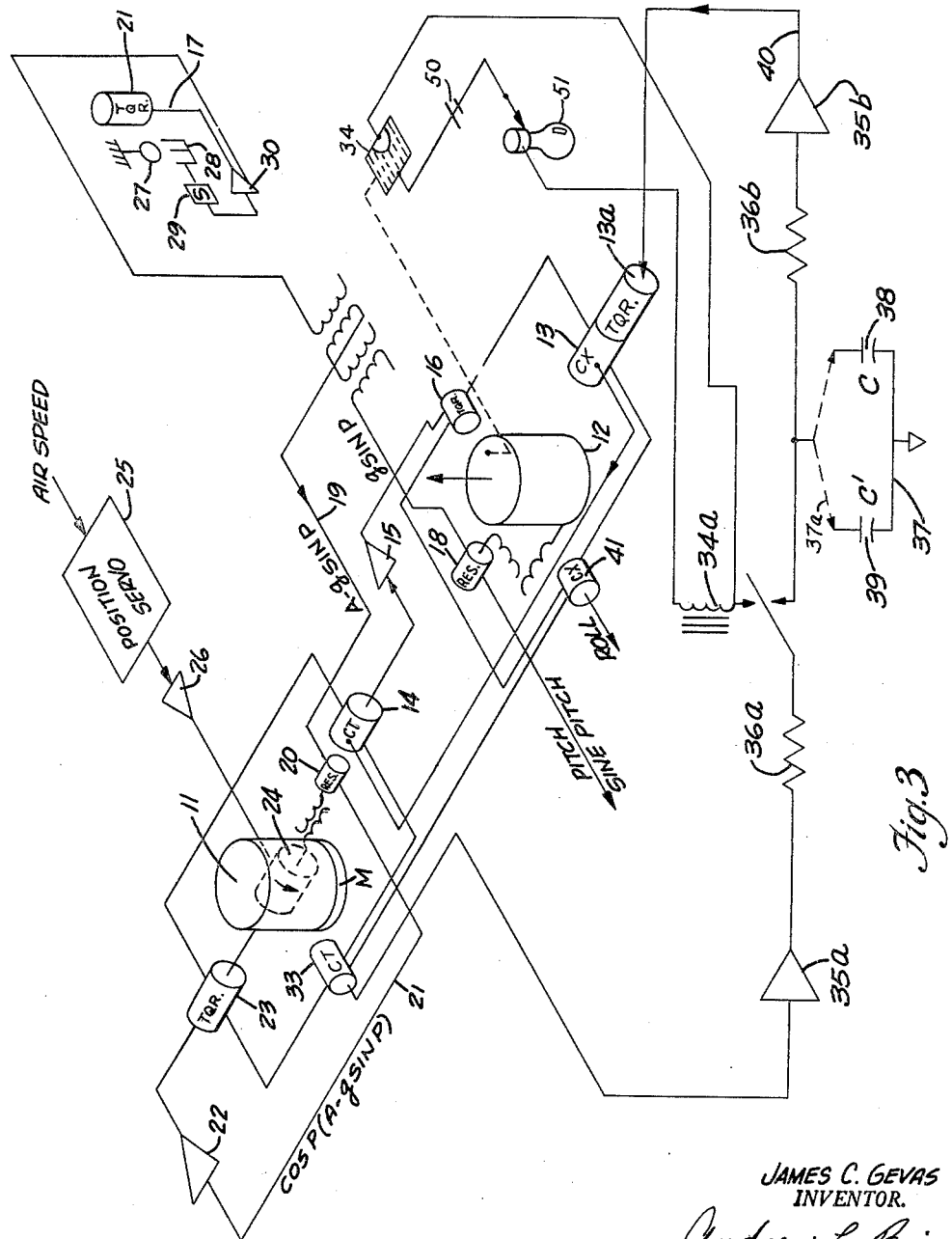

United States Patent Office 3,051,006
Patented Aug. 28, 1962

3,051,006
VERTICAL REFERENCE SYSTEM
James C. Gevas, Newark, N.J., assignor to General Precision, Inc., Little Falls, N.J., a corporation of Delaware
Filed Apr. 6, 1960, Ser. No. 20,291
3 Claims. (Cl. 74—5.41)

The present invention relates to a vertical reference system for use by aircraft, and more particularly to a vertical reference system which is self contained in the aircraft and requires no information from outside sources such as Doppler radar information.

It is well known that an aircraft vertical reference system includes the combination of a long term reference, e.g., a pendulum which is readily displaced from the vertical by any horizontal acceleration, but which will eventually return to giving a true vertical indication, and a short term reference, e.g., a gyro which will remain in the true vertical for a short time, but drifts from vertical for reasons well known in the art and already explained in considerable patent literature on the subject. The gyro element is therefore slaved to the pendulous element, and in this way, drift is prevented. In the case of aircraft take-off, the aircraft may be operating under acceleration conditions for an extended period of time. During this time, the pendulum will not indicate true vertical and the time period is long enough to cause the gyro to be slaved to the incorrect vertical reference. At present, during take-offs, Doppler radar may be used in the system for this time period. The aircraft must therefore carry this additional equipment, a minimum of about eighty pounds, and besides being costly, is far from satisfactory. Furthermore, during an aircraft turn, the pendulum will not indicate true vertical. It is therefore customary to free the gyro from the pendulum during this period. However, although the gyro is a good short term reference, the time period of the turn may be long enough for the gyro to drift off true vertical.

It has now been discovered that it is possible to keep the long term reference, or what has hereinbefore been called the pendulum, in true vertical during take-off in a self-contained system in the aircraft without the requirement of outside information such as Doppler radar information. Furthermore, during an aircraft turn, while the gyro is freed from the pendulum, information as to vertical position can be provided the gyro to compensate for the absence of steadying influence of the pendulum.

It is an object of the present invention to provide an aircraft vertical reference system.

It is a further object of the present invention to provide a correct vertical reference during an aircraft turn.

With the foregoing and other objects in view, the invention resides in the novel arrangement and combination of components and in the details of construction hereinafter described and claimed, it being understood that changes in the precise embodiment of the invention herein disclosed may be made within the scope of what is claimed without departing from the spirit of the invention. The advantages of the invention will become apparent from the following description taken in conjunction with the accompanying drawing in which:

FIGURE 1 graphically illustrates the component forces and the resultant forces caused by said components during the fore-aft acceleration of an aircraft on a pendulum in said aircraft;

FIGURE 2 depicts the results of centripetal acceleration on a pendulum in an aircraft during an aircraft turn;

FIGURE 3 is a somewhat schematic and diagrammatic explanation of the invention herein contemplated which will provide an aircraft vertical reference;

FIG. 4 is an explanation of the time cycle; and,

FIG. 5 is a schematic explanation of the equivalent circuits to the circuits depicted in FIG. 3 for the time periods illustrated in FIG. 4, relating to the memory circuit contemplated herein.

Error in indicating true vertical by the vertical reference system, i.e., the combination of the long term pendulum and the short term gyro results from two fundamental causes; fore-aft acceleration, and an aircraft turn, for the purpose of the present invention, any error due to Coriolis and east-west velocity around the earth's polar axis is disregarded, as such error will not exceed 1° for typical flight conditions. To better understand the operation of the invention, it is first necessary to visualize the problems which must be solved. Once this is understood, the operation of the various components of the device and their relation to the solution of the problem will become clear.

In the case of fore-aft acceleration, when acceleration is at a pitch angle $p$, there must be subtracted from the theoretical acceleration A, in order to obtain the true acceleration and amount equal to gravity multiplied by the sine of the pitch angle ($g \sin p$), as depicted in FIG. 1. It is however the force of the acceleration in the horizontal plane which is applied against the pendulum's sensitive axis. This force against the pendulum is equal to the true fore-aft acceleration multiplied by the cosine of the pitch angle, or, $H = \cos p \ (A - g \sin p)$. If the aircraft makes a turn, it experiences a centripetal acceleration equal to the product of the rate of turn of the aircraft about the instantaneous center of its turn, and its ground speed. If the centripetal acceleration forces the pendulum 45 degrees off true vertical about the roll axis, the pitch fore-aft acceleration compensation of the pendulous gyro would be in error by cosine 45°. Therefore, in addition to the compensation for fore-aft acceleration, additional compensation must be provided during the aircraft turn to counteract the effect of centripetal acceleration. This is done by creating a situation where the unbalance torque imposed on the pendulum about the roll axis by centripetal acceleration is opposed by a gyroscopic torque. As illustrated in FIG. 2, centripetal acceleration acts in such a direction as to force the pendulous gyro off true vertical by rotating it about an aircraft roll axis. Turning the gyro spin vector about the azimuth axis at a rate of $\theta°$ will cause a gyroscopic reaction torque $\theta° \times M$ (where M is the gyro angular momentum about the aircraft roll axis). If the gyro motor is driven in the proper direction, the two torques will oppose each other. In order for the two torques to cancel each other, a situation is required where the gyroscopic reaction torque $\theta° \times M =$ (pendulum mass unbalance) $\times \theta° \times$ ground speed. $\theta°$ can then be eliminated from each side of the equation. The desired ratio between gyro angular momentum and pendulous mass unbalance can be supplied by proper design. The relation between the gyro angular momentum and ground speed is accomplished by varying the spin frequency of the synchronous gyro motor in proportion to ground speed. Precise results, although preferable are not essential since the compensation for the effect of centripetal acceleration to correct the pitch error need only be about 50% of the required compensation to make the effect thereof negligible. During an aircraft turn, the gyro which is slaved to the pendulum is freed therefrom and supplies the vertical reference.

Broadly stated therefore, this invention contemplates providing a separate long term pendulum reference, and a short term gyro reference. The gyro is slaved to the pendulum in pitch by slow reacting slaving means so that when the pendulum goes off true vertical, the gyro will continue to indicate true vertical for a short period of time. During this time, the error in the pendulum will be corrected and when the gyro does start reacting to the slaving means, the pendulum will again indicate true vertical. In roll, on the other hand, the gyro is loosely slaved to the pendulum, but freed therefrom during an aircraft turn. When the aircraft is turning, and only during this time, the vertical gyro slaving rate is supplied by a memory circuit in the roll slaving system, while there is supplied to the pendulum a gyroscopic torque about equal and opposed to the unbalance torque imposed on the pendulum about the roll axis by centripetal acceleration resulting from the aircraft turn. In a still broader aspect of the present invention, the memory circuit herein contemplated may be used with other combinations of a servo means and a driven means where the servo means drives the driven means at a constant rate for a certain period of time, but due to distortion or noise, the servo means must be temporarily disconnected from the driven means. During this temporary period, the driven means may be driven at the last servo rate by the memory circuit herein contemplated, e.g., when a servo means drives a shaft and has to be temporarily disconnected from driving the shaft because of noise.

In carrying the invention into practice, in order to supply an aircraft vertical reference, there is provided in combination with a pendulum, having a gyro slaved thereto, first and second groups of components, designed to correct error due to fore-aft acceleration, and, error caused by centripetal acceleration because of an aircraft turn; said first group comprising, an accelerometer that yields a theoretical aircraft acceleration, a first resolver adapted to give true acceleration therefrom, a second resolver adapted to provide horizontal acceleration from said true acceleration, torque means applied to said pendulum responsive to and opposed to said horizontal acceleration; said second group comprising a gyro motor designed to rotate said pendulum about the roll axis; means responsive to an input equivalent to the approximate aircraft speed adapted to cause said motor to rotate in a direction and speed so as to oppose a gyroscopic torque imposed on said pendulum resulting from centripetal acceleration; switch means adapted to release said gyro from said pendulum during an aircraft turn; and, an electromechanical condenser chopper memory circuit adapted to supply the roll slaving rate to the vertical gyro.

In accordance with the preferred embodiment, there is provided a long term reference in the form of a pendulous gyro 11. A vertical gyro 12 is continuously slaved in roll to the pendulous gyro, e.g., the element acting as the pendulum 11, except during an aircraft turn during which the vertical gyro acts as a short term vertical reference and the roll slaving rate is supplied by a memory circuit hereinafter described. In pitch on the other hand, the gyro is slaved to pendulum 11 by slow reacting slaving means which include a control transmitter, referred to sometimes as a CX, 13, shown as being associated with the gyro 12, and a control transformer, known as a CT, 14, shown as being associated with the pendulum, the combination of these two components indicating the angular displacement between the pendulum and the gyro in pitch. This indication is fed to an amplifier 15 and applied to a roll axis torquer 16, the torque of which is applied to gyro 12 to again align it with pendulum 11 in pitch. Fore-aft acceleration is obtained from an accelerometer 17. Associated with gyro 12 is a sine-cosine resolver 18 adapted to provide the sine of the pitch angle with reference to gyro 12. This is a transformer arrangement well known in the art and shown schematically in the drawing. If the coupling of this type of resolver is parallel, the ratio of primary and secondary windings are such as to give the cosine of the pitch angle. If the windings are at right angles to each other as depicted schematically in the drawing between gyro 12 and resolver 18, the output of the secondary is the sine of the pitch angle. A value equal to $g \sin p$, $p$ being the pitch angle, is generated by resolver 18 which is adapted to multiply the input gravity $g$ by sine pitch, thus furnishing an electrical value which is applied as a bucking voltage, i.e., flowing in a direction contrary to the accelerometer output A to obtain an output of $(A - g \sin p)$ 19. A second resolver 20 on the pendulum whose input is $(A - g \sin p)$ just obtained in circuit 19 generates the $\cos p(A - g \sin p)$ 21. This is the factor required, which when properly amplified by amplifier 22 can be used to actuate a pitch axis torquer 23 to apply a torque to pendulum 11 equal and opposite to the force caused by the fore-aft acceleration, eliminating the net effect on the pendulum caused by this acceleration. The essentially instantaneous correction of the pendulum error by components 17, 18, 20, 22 and 23 before gyro 12 can react to an error via the servo loop formed by elements 13, 14, 15 and 16 is a matter of proper design, particularly of the roll axis and pitch axis torquers.

To compensate for the centripetal acceleration it is necessary to vary the angular momentum of synchronous gyro motor 24 which forms part of pendulum 11. Since ground speed is not readily available, air speed is used as the input to a position servo 25 which controls the frequency and voltage of power amplifier 26, supplying power to motor 24. For most applications, air speed is not an accurate measure of ground speed. Fortunately, only 50% of the required compensation will make the effect of centripetal acceleration negligible on the pitch compensation so that the fact that the results are not mathematically correct does not affect the value of the compensation. It is also possible to eliminate position servo 25, in which case there is fed to the amplifier an average or estimated ground speed derived by other means known in the art, e.g., the mean of the maximum and minimum air speeds.

During an aircraft turn, the gyro is freed from the pendulum in roll by bubble switch 34 and the vertical reference is obtained therefrom. During this time, the vertical gyro slaving rate is supplied by a memory circuit as depicted in FIG. 3. This memory circuit comprises preamplifier 35a indicating or furnishing the angular displacement between the pendulum and the gyro, a first resistance 36a, a relay 34a, which is connected in a series circuit with a bubble switch 34, a power source 50 and a lamp 51, an electromechanical chopper 37 having a pair of condensers fed by feeding means 37a 38 and 39, i.e., condensers C and C', a second resistance 36b, a post-amplifier 35b, and a connection 40 from the post-amplifier to a pitch axis torquer 13a. In normal operation, i.e., when the aircraft is not turning, the contact of relay 34a is closed. The relay is only activated during a turn and opens the circuit. Thus, there is electrical continuity between resistors 36a and 36b. The chopper is in time phase with the signal carrier. As a consequence, one of the condensers, C' 39 would for example be in the circuit for one-half of the carrier cycle, and C or 38 would be in the cycle for the other half. The operation of the condensers is illustrated in FIGS. 4 and 5. In the drawing, the output of the memory circuitry is depicted as being the input of the post-amplifier during normal operation. With a practical post-amplifier input impedance and reasonable capacitor sizes, the use of the electromechanical chopper circuit herein described would result in less than 0.6 degree gyro roll error due to the typical maximum vertical gyro allowable drift rate of 0.3 degree per minute, if the channel were in memory mode for 20 minutes. This of course represents memory compensation for a much longer period of time than is required. If no memory compensation is provided, an error of 6 degrees would result. The error should not exceed one degree. Although this scheme will not correct for changes in earth rate as seen by the vertical gyro in roll, the error under typical aircraft turning rates of 66, 250 and 468 degrees per minute in cruise, approach, and extreme conditions, will be negligible.

The only error of consequence is that incurred in a very unlikely flight condition and this error is within 1 degree. If the aircraft is flying north-south at the equator and makes a 180 degree turn during cruising conditions, it may turn at the cruise turn rate of 66° per minute. Due to the memory mode precessing the vertical gyro with the wrong sense of earth rate since the gyro input axis is now turned 180°, the following error will result:

$$\theta \text{ error} = \int_0^{\pi/\theta°} \omega e (1 - \cos \theta° t) \, dt$$

where
$\omega e$ = earth rate 15 degrees per hour
$\theta$ = angle of gyro input axis from its original due north or due south direction
$\theta°$ = aircraft turning rate, 66°/min.

$$\theta \text{ error} = \left[ \omega e t - \frac{\sin (\theta° t)}{\theta°} \right]_0^{\frac{\pi}{\theta°}}$$

$$= \omega e \frac{\pi}{\theta°}$$

$$= 15 \times \frac{1}{60} \times \frac{180}{66}$$

$$= .67 \text{ degree}$$

$$= 40 \text{ minutes}$$

For all other combinations of latitude and aircraft deviation from due north or due south flight, this error will be less. For example:

$\theta$ error at 60° latitude for due north-south flight turn = $\theta$ error at 0° latitude × cos 60° = 20 minutes
$\theta$ error at any latitude for east-west flight is zero Thus, by use of the arrangement herein described, roll errors incurred during aircraft turns do not exceed one degree and are usually negligible additions to the non-accelerated flight error.

Although the foregoing components, taken individually may in some cases be known in the art and commercially available, a description of these components will prove helpful in understanding the invention. The vertical gyro has two degrees of freedom of about 360° in roll and 85° in pitch. Accelerometer 17 usually includes a pendulum 27 over an E-bridge 28; sensing means 29 associated with E-bridge 28 sense the acceleration. The sensed output is amplified in an amplifier 30 and fed to a torquer 21. Pendulous gyro 11 has two gimbal axes, roll and pitch. The outer gimbal is the roll gimbal, and has the pitch axis suspended within it, as shown in the drawing. The pitch axis shaft has a gyro motor 24, and a pendulous mass M suspended therefrom. The stator of the motor is secured to the pitch axis shaft and the rotor of the motor rotates about the pitch axis shaft. The roll gimbal is suspended in bearings on the pendulous gyro outer frame, which is bolted to the airframe. Because of the suspended mass, the entire roll gimbal including the suspended pitch axis hardware, is pendulous about the roll and pitch axes. From the theoretical standpoint, either or both of resolvers 18 and 20 can be associated with the gyro, and, although this can be accomplished, in practice, the device is optimized mechanically with one resolver associated with each of the gyros. The pendulous displacement in roll as well as aircraft roll are sensed by a roll axis synchro 33 depicted as a CT, whose rotor is secured to the roll axis shaft, and whose stator is secured to the pendulous gyro outer frame. The roll command is transmitted from this synchro 33 acting in combination with CX 41 on the gyro, to pitch axis torquer 13a. It is between these two elements, 33 and 13a that the memory circuit herein contemplated is disposed. In connection with the power amplifier 26, it is advantageous to provide for the addition of capitance for gyro motor tuning to ease the electronics design. The capacitance addition may be performed by cam actuated switches in position servo 25. The entire system includes a bubble switch 34 on the vertical gyro to indicate when the system is in error by more than about two degrees as well as to cut off roll slaving of gyro 12 to pendulum 11 when in turns when the roll rate is supplied by the memory circuit. The operation of the position servo, also known as a positional servomechanism has been described in technical literature, e.g., Brown and Campbell, "Principles of Servomechanisms," John Wiley & Sons, N.Y., 1948, pages 42 to 48. The control transmitter and control transformer, known as a CX and CT usually comprise a coil primary and Y secondary which connects with a Y primary having a coil secondary. Any change in either of the rotors with regard to their angular relationship to the corresponding coil will of course affect the voltage and current in the coil thus giving an electrical measure proportional to the relative displacement between the two rotors. To make the explanation of the invention more vivid, the term pendulum has been used in the present specification where the drawing shows a pendulous gyro, and the simple term gyro has been used instead of vertical gyro or vertical gyroscope. To facilitate the understanding of the memory circuit described herein, an explanation of the action of condensers C and C', i.e., 38 and 39 is given graphically in FIG. 4 in connection with the equivalent circuit of FIG. 5. Note that C and C' act as D.C. circuit elements individually, and as A.C. elements collectively, thus acting as a combined demodulator-modulator. The time constant of C and 36b is easily made large enough to store the last peak charge for as long as is necessary without significant voltage loss on C and C', therein accomplishing the memory function.

In actual construction of the device, the disposition of the components may differ from the position shown in the drawing. The coil coupling at right angles for resolver 18 and parallel for resolver 20 should take place inside the resolver, of course, and not on the outside as shown in the drawing.

It is to be observed therefore, that the present invention provides for a memory circuit, used in connection with a servo means which supplies information or a rate to some driven means, which servo means must be disconnected from the driven means from time to time because of noise or errors, and it can be assumed that during this time, to properly drive the driven means, the driven means should be receiving the last servo information or rate before the disconnection. The invention generally comprises introducing a mechanical, or electromechanical chopper formed by a pair of condensers in push-pull arrangement, though an all-electronic chopper can also be used. The invention is particularly useful in an aircraft vertical reference system utilizing the combination of a pendulum having a gyro slaved thereto, i.e., a long term reference having a short term reference slaved thereto, said elements being disconnected during the period of an aircraft turn. During this period, and only during this period, the roll slaving rate is supplied to the gyro by the electromechanical chopper herein described.

Some of the features of the present invention will also be found in a co-pending patent application likewise entitled Vertical Reference System, filed on February 26, 1960, Serial No. 11,351, of which the present application is a continuation-in-part.

Although the present invention has been described in conjunction with preferred embodiments, it is to be understood that modifications and variations may be resorted to without departing from the spirit and scope of the invention, as those skilled in the art will readily understand. Such modifications and variations are con-

I claim:

1. In a servo loop wherein a servo means provides driving information to a driven means, including means to temporarily disconnect the servo means from said driven means under error conditions, the improvement therein, comprising in combination, a pair of condensers in the servo loop, mechanical means periodically feeding one or the other condenser with a driving signal supplied by said servo means, and, an amplifier between said condensers and said driven means, whereby, upon releasing said driven means from said servo means for a short period of time, said condensers will continue to provide the last driving signal stored thereon for said short period of time to the driven means.

2. In a servo loop wherein a servo means provides driving information to a driven means, including means to temporarily disconnect the servo means from said driven means under error conditions, the improvement therein, comprising in combination, a pair of condensers in the servo loop, means periodically feeding one or the other condenser with a driving signal supplied by said servo means, and, an amplifier between said condensers and said driven means, whereby, upon releasing said driven means from said servo means for a short period of time, said condensers will continue to provide the last driving signal stored thereon for said short period of time to the driven means.

3. In a vehicle, in combination with a pendulum having a gyro slaved thereto designed to give a vertical reference for said vehicle; an accelerometer yielding a theoretical acceleration; a first resolver, adapted to provide a value corresponding to gravity multiplied by the sine of the pitch angle which when applied as a bucking output to said accelerometer output yields the true acceleration; a second resolver, adapted to provide horizontal acceleration from said true acceleration; pitch axis torque means applied to said pendulum, responsive and opposed to said horizontal acceleration; a synchro, adapted to provide a signal proportional to the angle between said pendulum and said vehicle about said pendulum roll axis; a pair of condensers; and means periodically feeding one or the other condenser with a driving signal supplied by said synchro whereby, upon releasing said gyro from said pendulum for a short period of time, said condensers will continue to provide the last driving signal stored thereon for said short period of time to the gyro.

References Cited in the file of this patent

UNITED STATES PATENTS

| | | |
|---|---|---|
| 1,932,210 | Glitscher | Oct. 24, 1933 |
| 2,597,151 | Konet | May 20, 1952 |
| 2,608,867 | Kellogg et al. | Sept. 2, 1952 |
| 2,786,357 | Quermann et al. | Mar. 26, 1957 |
| 2,928,282 | La Hue | Mar. 15, 1960 |